US012735198B1

(12) United States Patent
Niquette et al.

(10) Patent No.: US 12,735,198 B1
(45) Date of Patent: Sep. 15, 2026

(54) EXTENSION OF SysML FOR FUNCTIONAL HAZARD ANALYSIS

(71) Applicant: RTX CORPORATION, Farmington, CT (US)

(72) Inventors: Alyssa Niquette, Rocky Hill, CT (US); Charles J. Nobilski, Vernon, CT (US)

(73) Assignee: RTX CORPORATION, Farmington, CT (US)

( * ) Notice: Subject to any disclaimer, the term of this patent is extended or adjusted under 35 U.S.C. 154(b) by 79 days.

(21) Appl. No.: 18/672,257

(22) Filed: May 23, 2024

Related U.S. Application Data

(63) Continuation of application No. 18/495,332, filed on Oct. 26, 2023, now abandoned.

(51) Int. Cl.
*B64F 5/60* (2017.01)

(52) U.S. Cl.
CPC ..................................... *B64F 5/60* (2017.01)

(58) Field of Classification Search
CPC ........................................................ B64F 5/60
See application file for complete search history.

(56) References Cited

U.S. PATENT DOCUMENTS 10,423,884 B2 9/2019 Hyde et al.
11,347,919 B2 5/2022 Heilmann et al.
2009/0144599 A1* 6/2009 Leblond ............. G06F 11/3672 714/752
2009/0172632 A1* 7/2009 Kashai ...................... G06F 8/10 717/104
2011/0191089 A1* 8/2011 Votintseva ............ G06Q 10/06 703/13
2012/0254710 A1* 10/2012 Flanagan ........... G06Q 10/0631 715/202

(Continued)

FOREIGN PATENT DOCUMENTS

CN 110765568 A * 2/2020
CN 111427556 B * 3/2022 .............. G06F 8/37

(Continued)

OTHER PUBLICATIONS

SAE: ARP 4761, Guidelines and Methods for Conducting the Safety Assessment Process on Civil Airborne Systems and Equipment, USA, (Year: 1996).*

(Continued)

*Primary Examiner* — Donald J Wallace
*Assistant Examiner* — Jalal C Coduroglu
(74) *Attorney, Agent, or Firm* — Carlson, Gaskey & Olds, P.C.

(57) ABSTRACT

A method is disclosed of using Systems Modeling Language (SysML) for a hazard analysis description that describes a potential functional failure of a physical system. The method includes describing the potential functional failure of the physical system in SysML using a first type of custom SysML element; and describing at least one potential cause and at least one potential effect of the potential functional failure with respective instances of a second type of custom SysML element, wherein the first type of custom SysML element has a different SysML metaclass than the second type of custom SysML element. A method of using SysML for a hazard analysis description and a system for using SysML for a hazard analysis description are also disclosed.

17 Claims, 8 Drawing Sheets

(56) References Cited

U.S. PATENT DOCUMENTS

| | | | | |
|---|---|---|---|---|
| 2013/0013993 | A1* | 1/2013 | Oh | G06F 30/20<br>715/212 |
| 2015/0019187 | A1* | 1/2015 | Jones | G05B 23/0251<br>703/8 |
| 2016/0357895 | A1* | 12/2016 | Hyde | G06N 7/01 |
| 2019/0108084 | A1* | 4/2019 | Hipp | G05B 23/0278 |
| 2021/0049060 | A1* | 2/2021 | Heilmann | G06F 11/0772 |
| 2022/0058323 | A1* | 2/2022 | Heilmann | G05B 23/0248 |
| 2022/0066403 | A1* | 3/2022 | Kaukewitsch | G05B 13/042 |
| 2022/0230485 | A1* | 7/2022 | Bajpai | B60W 50/02 |
| 2022/0247678 | A1* | 8/2022 | Atwal | H04W 24/02 |
| 2022/0358612 | A1* | 11/2022 | Heilmann | G06N 3/006 |
| 2023/0028912 | A1* | 1/2023 | Steingrimsson | G06F 30/27 |
| 2023/0229439 | A1* | 7/2023 | Huang | G06F 11/3604<br>717/121 |
| 2023/0305550 | A1* | 9/2023 | Zhong | G05B 23/0243 |
| 2025/0200208 | A1* | 6/2025 | Roper, Jr. | G06F 21/6218 |
| 2025/0217114 | A1* | 7/2025 | Roper, Jr. | G06N 3/02 |

FOREIGN PATENT DOCUMENTS

| | | |
|---|---|---|
| CN | 114218781 | 3/2022 |
| CN | 114816431 | 7/2022 |
| CN | 115688650 | 2/2023 |
| CN | 115718803 | 2/2023 |
| CN | 116483705 | 7/2023 |

OTHER PUBLICATIONS

Mechatronics 21 (2011) 1063-1075 System-level model integration of design and simulation for mechatronic systems based on SysML Yue Cao a, Yusheng Liu a,b, ⇑, Christiaan J.J. Paredis b (Year: 2011).*

FAA: AC 23.1309-1E, System Safety Analysis and Assessment for Part 23 Airplanes, USA, 2011 (Year: 2011).*

2016 Annual IEEE Systems Conference (SysCon)The Hazard Analysis Profile: Linking Safety Analysis and SysML Martina Müller, Michael Roth, Udo Lindemann—Institute of Product Development DOI: 10.1109/SYSCON.2016.7490532, Electronic ISBN:978-1-4673-9519-9 (Year: 2016).*

Software and Systems Modeling (2020) 19:889-910—Special Section Paper Model-based safety assessment with SysML and component fault trees: application and lessons learned Peter Munk1 • Arne Nordmann1 (Year: 2020).*

* cited by examiner

| SUBSYSTEM | COMPONENT | COMPONENT FUNCTION | △ NAME | ANTI-FUNCTION/CAUSE | FUNCTIONAL FAILURE EFFECTS | ASSOCIATED TOP LEVEL HAZARDS | MAX SEVERITY OF TOP HAZARDS | MITIGATIONS |
|---|---|---|---|---|---|---|---|---|
| □BRAKING SYSTEM (12A) | □BRAKE FLUID MANIFOLD BRAKE FLUID MANIFOLD (14A) | □PROVIDE BRAKE FLUID PROVIDE BRAKE FLUID (24A) | △ LEAK IN BRAKE MANIFOLD (BRAKE FLUID) (26A) | □O-RING COMPRESSION SET (CREEP) FAILURE (40A)<br>□SURFACE DAMAGE DURING ASSEMBLY (40B) | □C-1 HAZARD ANALYSIS<br>□NO LEFT WHEEL BRAKING (40D)<br>□DECREASED PRESSURE TO MAIN BRAKE HOSE (40C)<br>□REDUCED AIRCRAFT DECELERATION ON GROUND AND SIDE DRIFT (40E)<br>□RISK OF COLLISION (40G)<br>□PARTIAL LOSS OF RUNWAY POSITION CONTROL (40F) | □MODERATE LACK OF POSITIONAL CONTROL (28B)<br>□COLLISION (28A) | ◇I-CATASTROPHIC | □10 MINIMUM STRENGTH (44A)<br>□11 O-RING INSPECTION/ REPLACEMENT (44B) |

FIG.7

EXTENSION OF SysML FOR FUNCTIONAL HAZARD ANALYSIS

CROSS-REFERENCE TO RELATED APPLICATIONS

This application is a continuation of U.S. patent application Ser. No. 18/495,332 filed Oct. 26, 2023, the disclosure of which is incorporated by reference in its entirety herein.

BACKGROUND

This application relates to Systems Modeling Language ("SysML"), and more particularly to utilizing SysML for functional hazard analysis (FHA).

SysML is a general-purpose modeling language for systems engineering applications. It supports the specification, analysis, design, verification and validation of a broad range of systems and systems-of-systems, and is the industry standard for model-based engineering.

FHA is a hazard analysis method used to evaluate the potential causes and hazardous consequences of a system's "functional failures." An asset is considered to have experienced a "functional failure" if it can no longer perform its function. FHA looks at what major failures of function can occur, the effects of those failures, the risks associated with them, and safety criteria that can be used to make the risks acceptable.

SysML has a number of native metaclasses which act as categories for SysML elements within the metaclass. Some example metaclasses include class, dependency, and activity. Within a metaclass, a custom SysML element type can be created. Prior art techniques for utilizing SysML for FHA have utilized a large number of custom elements within SysML. While this lends itself well to importing and exporting failure mode descriptions between another spreadsheet tool and the SysML model in a table format, it also undesirably increases overhead and complexity in the SysML representation of each failure mode.

SUMMARY

A method of using SysML for a hazard analysis description that describes a potential functional failure of a physical system according to an example embodiment of the present disclosure includes describing the potential functional failure of the physical system in SysML using a first type of custom SysML element; and describing at least one potential cause and at least one potential effect of the potential functional failure with respective instances of a second type of custom SysML element. The first type of custom SysML element has a different SysML metaclass than the second type of custom SysML element.

In a further embodiment of the foregoing embodiment, the method includes linking the at least one cause and the at least one effect to the potential functional failure using respective instances of a third type of custom SysML element that represents causation.

In a further embodiment of any of the foregoing embodiments, the third type of custom SysML element has a different SysML metaclass than the first type of custom SysML element and the second type of custom SysML element.

In a further embodiment of any of the foregoing embodiments, the metaclass of the first type of custom SysML element is class, the metaclass of the second type of custom SysML element is activity, and the metaclass of the third type of custom SysML element is dependency.

In a further embodiment of any of the foregoing embodiments, the method includes describing in SysML each of one or mitigations that can be implemented to mitigate an effect or likelihood of the potential functional failure; and linking each of the one or more mitigations to the potential functional failure using a respective fourth type of custom SysML element.

In a further embodiment of any of the foregoing embodiments, the fourth type of custom SysML element and the third type of SysML element have a same SysML metaclass.

In a further embodiment of any of the foregoing embodiments, each of the mitigations is described using one or more native, non-custom SysML element types.

In a further embodiment of any of the foregoing embodiments, the method includes describing a potential system level effect of the potential functional failure using a fifth type of custom SysML element. The potential system level effect is linked to and is a higher level effect than a particular one of the at least one potential effects. The potential system level effect is linked to the particular one of the at least one potential effects using an instance of the third type of custom SysML element.

A method of using SysML for a hazard analysis description that describes a potential functional failure of a physical system according to an example embodiment of the present disclosure includes describing the potential functional failure of the physical system in SysML using a first type of SysML element; and describing at least one potential cause and at least one potential effect of the potential functional failure with respective instances of a second type of SysML element. The first type of SysML element has a different SysML metaclass than the second type of SysML element.

In a further embodiment of the foregoing embodiment, the method includes linking the at least one cause and the at least one effect to the potential functional failure using respective instances of a third type of SysML element that represents causation. The third type of SysML element has a different SysML metaclass than the first type of SysML element and the second type of SysML element.

In a further embodiment of any of the foregoing embodiments, the metaclass of the first type of SysML element is class, the metaclass of the second type of SysML element is activity, and the metaclass of the third type of SysML element is dependency.

In a further embodiment of any of the foregoing embodiments, the method includes describing in SysML each of one or mitigations that can be implemented to mitigate an effect or likelihood of the potential functional failure; and linking each of the one or more mitigations to the potential functional failure using a respective fourth type of SysML element.

In a further embodiment of any of the foregoing embodiments, the fourth type of SysML element and the third type of SysML element have a same SysML metaclass.

In a further embodiment of any of the foregoing embodiments, the method includes describing a potential system level effect of the potential functional failure using a fifth type of SysML element. The potential system level effect is linked to and is a higher level effect than a particular one of the at least one potential effects. The potential system level effect is linked to the particular one of the at least one potential effects using an instance of the third type of SysML element.

A system for using SysML for a hazard analysis description that describes a potential functional failure of a physical system according to an example embodiment of the present disclosure includes processing circuitry operatively connected to memory and configured to describe the potential functional failure of the physical system in SysML using a first type of custom SysML element, and describe at least one potential cause and at least one potential effect of the potential functional failure with respective instances of a second type of custom SysML element. The first type of custom SysML element has a different SysML metaclass than the second type of custom SysML element.

In a further embodiment of the foregoing embodiment, the processing circuitry is configured to link the at least one cause and the at least one effect to the potential functional failure using respective instances of a third type of custom SysML element that represents causation.

In a further embodiment of any of the foregoing embodiments, the third type of custom SysML element has a different SysML metaclass than the first type of custom SysML element and the second type of custom SysML element.

In a further embodiment of any of the foregoing embodiments, the metaclass of the first type of custom SysML element is class, the metaclass of the second type of custom SysML element is activity, and the metaclass of the third type of custom SysML element is dependency.

In a further embodiment of any of the foregoing embodiments, the processing circuitry is configured to describe in SysML each of one or mitigations that can be implemented to mitigate an effect or likelihood of the potential functional failure, and link each of the one or more mitigations to the potential functional failure using a respective fourth type of custom SysML element. The fourth type of custom SysML element and the third type of SysML element have a same SysML metaclass.

In a further embodiment of any of the foregoing embodiments, the processing circuitry is configured to describe a potential system level effect of the potential functional failure using a fifth type of custom SysML element. The potential system level effect is linked to and is a higher level effect than a particular one of the at least one potential effects. The potential system level effect is linked to the particular one of the at least one potential effects using an instance of the third type of custom SysML element.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

FIG. 7 is a schematic view of a functional failure of FIG. 4 in a table form.

DETAILED DESCRIPTION

Figure 1:
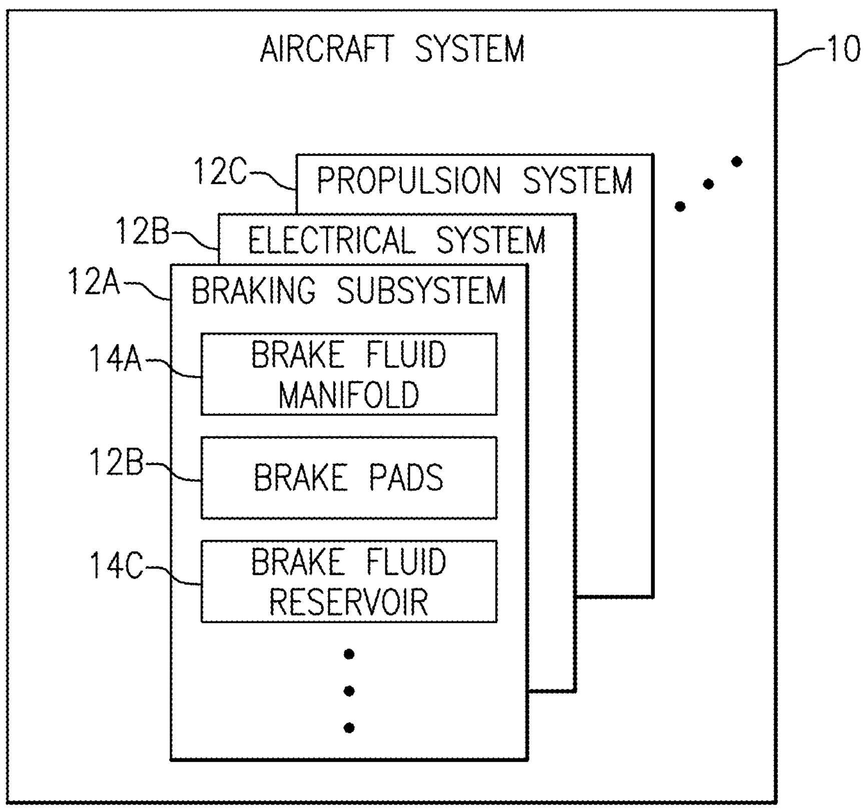
FIG. 1 is a schematic view of an example aircraft system.

FIG. 1 is a schematic view of a physical system which is an aircraft system 10 that includes a plurality of subsystems 12, of which three are shown, namely a braking subsystem 12A, an electrical subsystem 12B, and a propulsion subsystem 12C. Each subsystem 12 includes one or more respective components. As shown in FIG. 1, the braking system includes a brake fluid manifold 14A, brake pads 14B, a brake fluid reservoir 14C, and may include one or more other components as well. It is understood that this is a non-limiting example, and that any number of subsystems 12 and components 14 could be part of a physical system 12, and it is further understood that non-aircraft physical systems could be represented. Also, although components 14 are not shown for the electrical subsystem 12B or propulsion subsystem 12C, it is understood that those subsystems could also include components.

Figure 2:
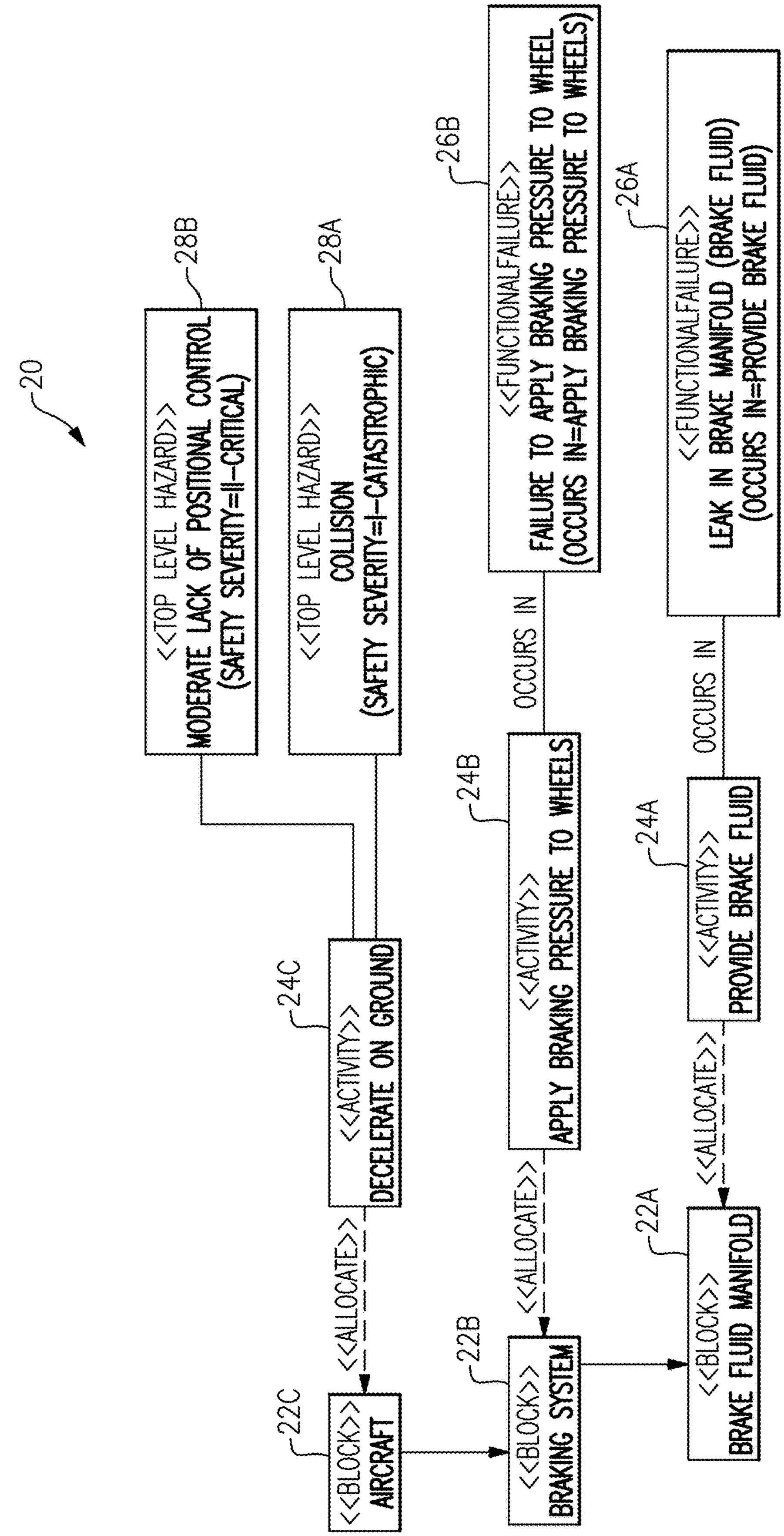
FIG. 2 is a schematic view of a SysML description of the aircraft system of FIG. 1 and two of its potential functional failures.

FIG. 2 is a schematic view of a SysML description 20 of the aircraft system 10 and its braking subsystem 12A that includes a plurality of "block" elements 22A-C, a plurality of "activity" elements 24A-C, two "functional failure" elements 26A-B, and a "top level hazard" element 28.

The block elements 22A-C correspond to the SysML metaclass of "block" and represent items shown in FIG. 1. In particular, the "brake fluid manifold" block element 22A representing the brake fluid manifold 14A of FIG. 1, the "braking subsystem" block element 22B represents the braking subsystem 12A of FIG. 1, and the "aircraft" block element 22C represents the aircraft system 10 of FIG. 1. Block elements describe structure components and their hierarchical relationship to each other, and are a native, non-custom element type in SysML.

Each of the "activity" elements 24A-C describe an intended function of its corresponding block element. Thus, the "provide brake fluid" activity element 24A describes an intended function of the brake fluid manifold block element 22A, the "apply braking pressure to wheels" activity element 24B describes an intended function of the braking subsystem block element 22B, and the "decelerate on ground" activity element 24C describes an intended function of the aircraft block element 22C.

Functional failure element 26A describes a potential functional failure of "leak in brake manifold (brake fluid)" that occurs in the activity element 24A ("provide brake fluid"). Functional failure element 26B describes a potential functional failure of "failure to apply braking pressure to wheel" that occurs in the activity element 24B ("apply braking pressure to wheels"). The functional failure element 26B is a potential effect of ocurrence of the functional failure element 26A.

Top level hazard elements 28A-B describe potential effects of occurrence of the functional failure 26B. These include "collision" top level hazard element 28A (severity level of "I-catastrophic"), and "moderate lack of positional control" top level hazard element 28B (severity level of "II-critical").

Figure 3:
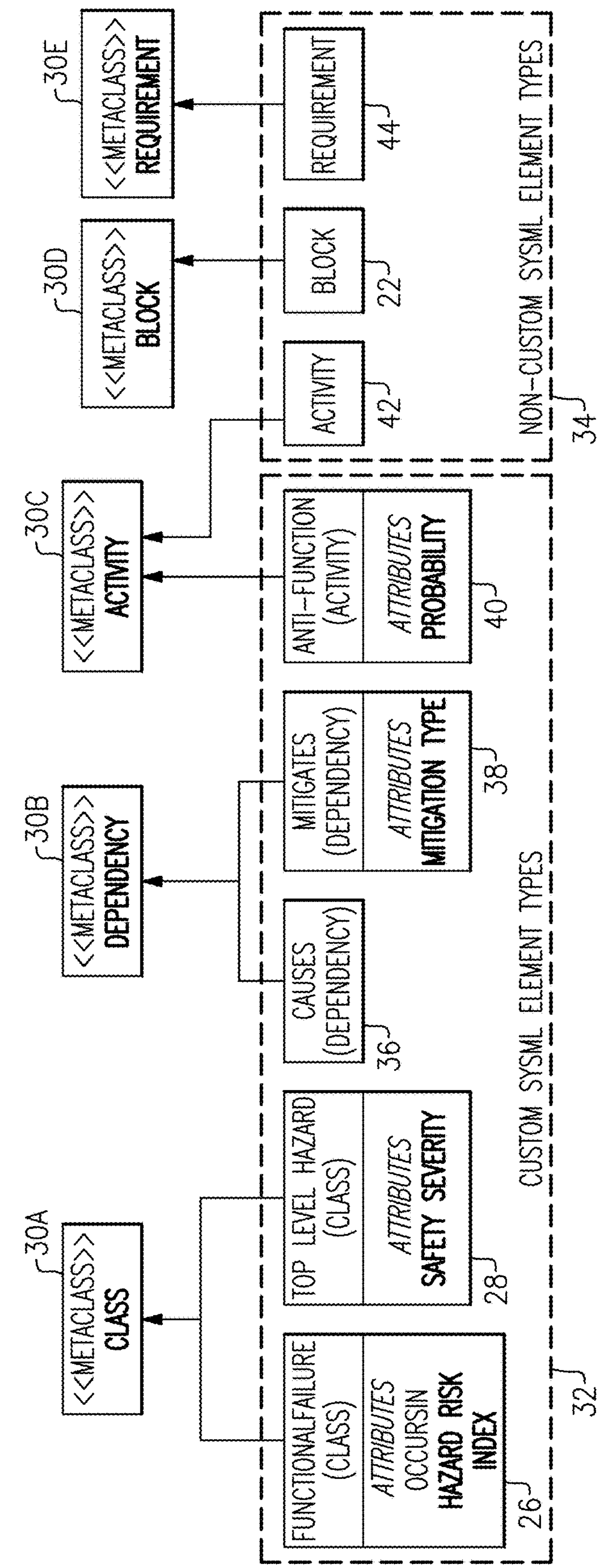
FIG. 3 is a schematic view of a plurality of different types of SysML metaclasses and SysML element types.

FIG. 3 is a schematic view of a plurality of different types of SysML metaclasses 30A-E and SysML element types.

Each of the metaclasses 30A-E is native to SysML, and they include "class" 30A, "dependency" 30B, "activity" 30C, "block" 30D, and "requirement" 30E. Within these metaclasses 30, a plurality of custom SysML element types 32 and native, non-custom SysML element types 34 are provided.

Custom element types "functional failure" 26 and "top level hazard" 28 correspond to metaclass "class" 30A. Custom element types "causes" 36 and "mitigates" 38 correspond to metaclass "dependency" 30B. The "causes" element type 36 denotes a causation between two separate elements. In the example of FIG. 3, the hazard analysis description includes no more than five types of custom SysML elements (i.e., no more than two types of custom SysML elements that have a metaclass of "class", no more than two types of custom SysML elements that have a metaclass of "dependency", and no more than one type of custom SysML element that has a metaclass of "activity"). However, it is understood that this is a non-limiting example.

Custom element type "anti-function" 40 and non-custom element type "activity" 42 both correspond to metaclass "activity" 30C. As discussed in greater detail below, the "anti-function" element type 40 describes a failure mode event that can be a cause or an effect of a functional failure.

Non-custom element type "requirement" 44 corresponds to metaclass "requirement" 30E, and a requirement or measure that can be taken to mitigate an effect or likelihood of a potential functional failure. The "mitigates" element type 38A connects another SysML element to a functional failure that having associated effects that it would be desirable to mitigate.

Figure 4:
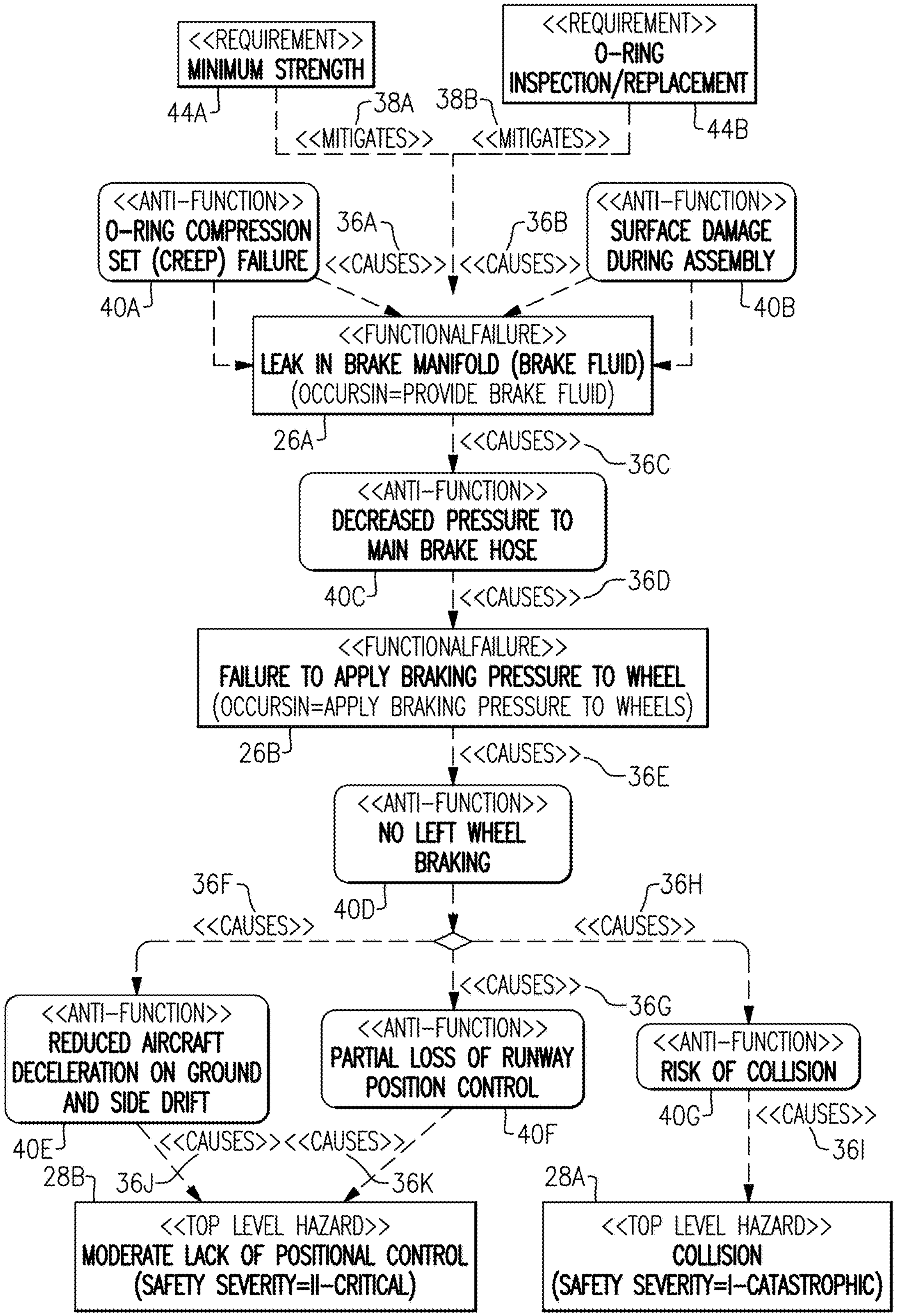
FIG. 4 is a schematic view of a SysML hazard analysis description that expands upon the SysML description of FIG. 2 using the SysML element types of FIG. 3.

FIG. 4 is a schematic view of a SysML hazard analysis description that expands upon the SysML description 20 of FIG. 2 using the SysML element types of FIG. 3. As shown, requirement SysML element 44A ("minimum strength" for the brake fluid manifold) and 44B (requirement for o-ring inspection and/or replacement) make the functional failure 26A less likely and/or mitigate its effect, and are linked to the functional failure 26A with "mitigates" SysML dependencies 38A-B.

Anti-functions 40A ("O-ring compression set (creep) failure") and 40B (surface damage during assembly) describe potential causes of the functional failure 26A, and are linked to the functional failure 26A using "causes" dependencies 36A-B.

The functional failure 26A ("leak in brake manifold (brake fluid)") is linked to the effect anti-function 40C ("decreased pressure to main brake hose") through "causes" dependency 36C, which denotes that decreased brake pressure may be caused by the functional failure 26A.

Anti-function 40C is linked to functional failure 26B ("failure to apply braking pressure to wheel") through "causes" dependency 36C, such that the anti-function 40C is both potentially caused by functional failure 26A and is a potential cause of functional failure 26B.

Anti-function 40D ("no left wheel braking") is linked to the functional failure 26B through "causes" dependency 36E, indicating that the anti-function 40D is potentially caused by the functional failure 26B.

Anti-function 40D is linked to additional anti-functions 40E ("reduced aircraft deceleration on ground and side drift"), 40F ("partial loss of runway position control"), and 40G ("risk of collision") through "causes" dependencies 36F, 36G, and 36H, respectively, indicating that "no left wheel braking" may cause one or more of the anti-functions 40E-G to occur.

Anti-function 40G is linked to top level hazard 28A ("collision") through "causes" dependency 36I, indicating that the top level hazard 28A may be caused by the anti-function 40G. Anti-functions 40E and 40F are related to top level hazard 28B ("moderate lack of positional control") through "causes" dependencies 36J and 36K, indicating that the top level hazard 28B may be caused by the anti-functions 40E and/or 40F.

Figure 5:
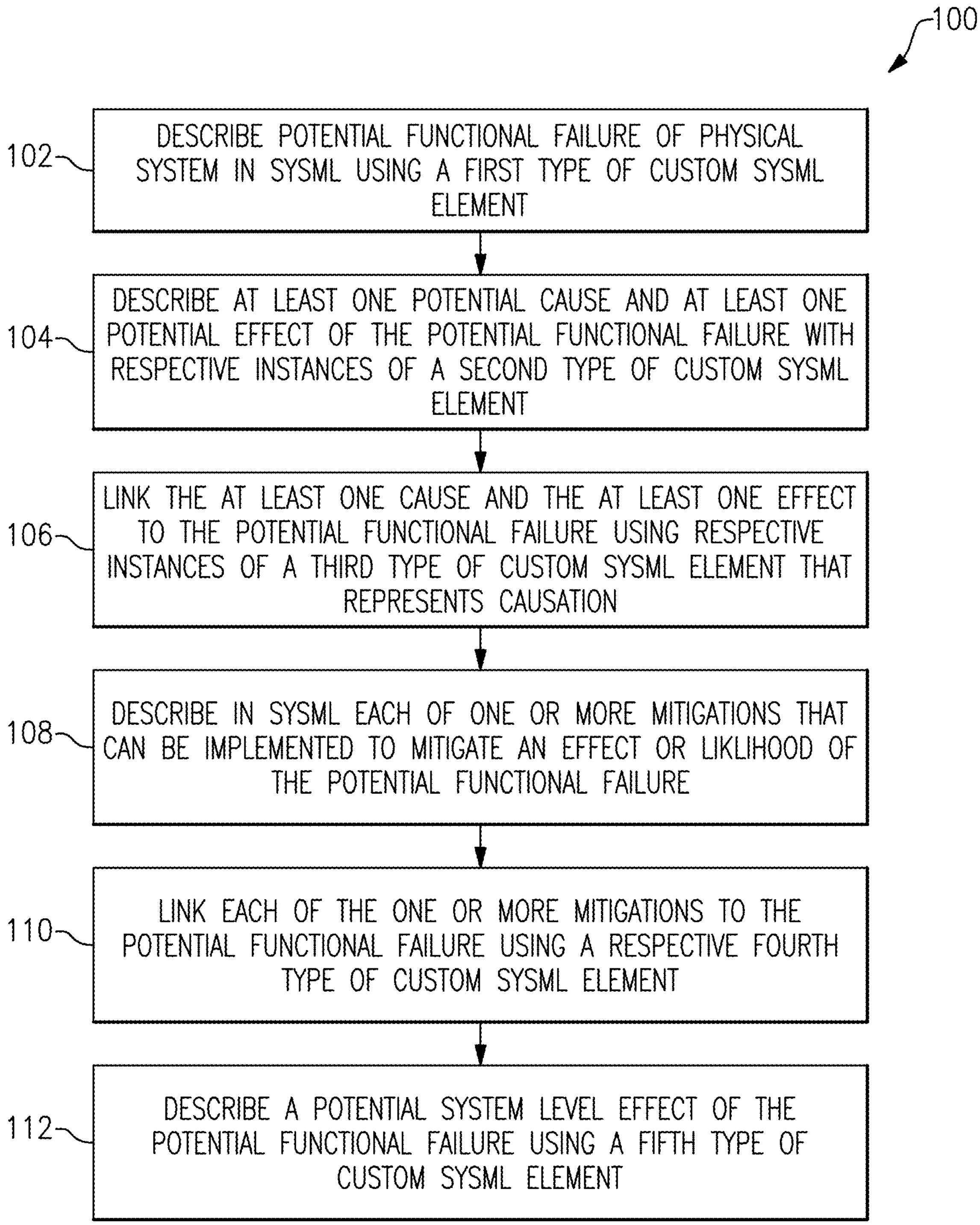
FIG. 5 is flowchart of an example method of using SysML for a hazard analysis description that describes a potential functional failure of a physical system.

FIG. 5 is flowchart of an example method 100 of using SysML for a hazard analysis description that describes a potential functional failure of a physical system (e.g., the aircraft system 10 of FIG. 1).

The potential functional failure of the physical system 10 is described in SysML using a first type of custom SysML element (e.g., the "functional failure" custom element type 26) (step 102).

At least one potential cause and at least one potential effect of the potential functional failure is described with respective instances of a second type of custom SysML element (e.g., the "anti-function" custom SysML element 40) (step 104), where the first type of custom SysML element has a different SysML metaclass than the second type of custom SysML element (e.g., "functional failure" has a metaclass of "class" and "anti-function" has a class of "activity"). As shown in the example of FIG. 4, the functional failure 26A includes causes in the form of anti-function SysML elements 40A-B, and includes an effect in the form of anti-function SysML element 40C.

The at least one cause and the at least one effect are linked to the potential functional failure using respective instances of a third type of custom SysML element that represents causation (e.g., the "causes" custom SysML element which has a metaclass of "dependency") (step 106).

In one or more embodiments, the fourth type of custom SysML element and the third type of SysML element have a same SysML metaclass of "dependency" 30B.

Each of one or mitigations that can be implemented to mitigate an effect or likelihood of the potential functional failure are described in SysML (step 108). The mitigations may be described using non-custom SysML elements (e.g., the "requirement" SysML element 44).

Each of the one or more mitigations from step 110 are linked to the potential functional failure of step 102 using a respective fourth type of custom SysML element (e.g., the "mitigates" custom SysML element 38) (step 110).

A potential system level effect of the potential functional failure is described using a fifth type of custom SysML element (e.g., the "top level hazard" custom SysML element 28) (step 112). The potential system level effect (e.g., top level hazard 28A) is linked to and is a higher level effect than a particular one of the at least one potential effects (e.g., top level hazard 28A is linked to and is a higher level effect than anti-function 40G).

Figure 6:
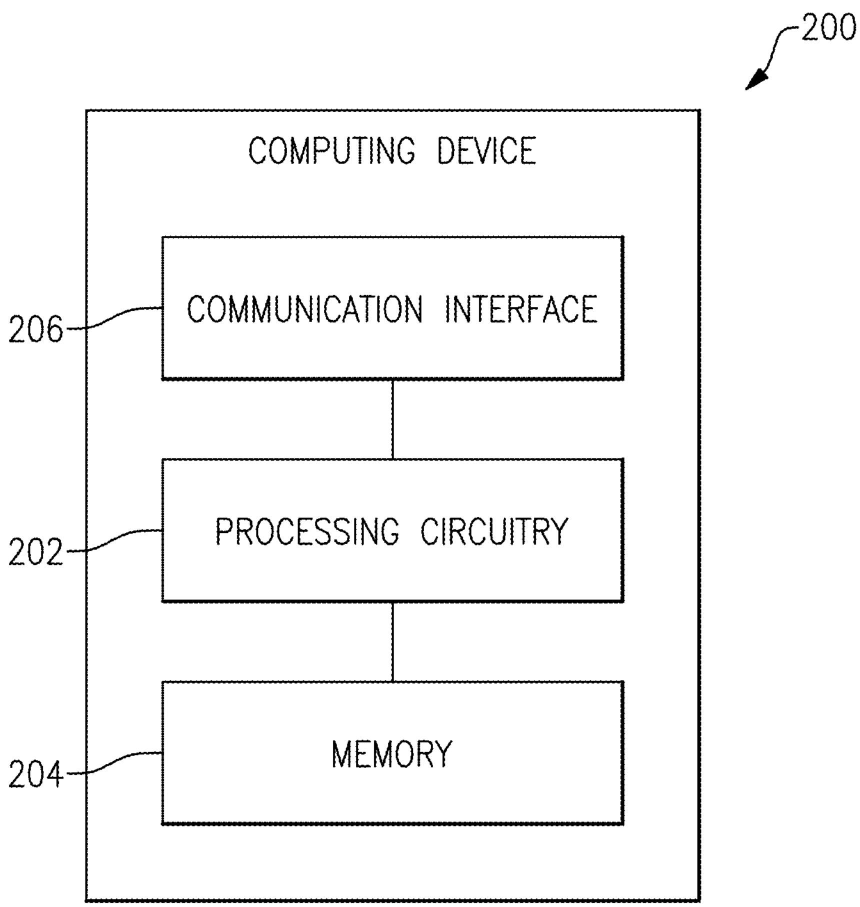
FIG. 6 is a schematic view of an example computing device, one or more of which may be used to perform the method of FIG. 5.

FIG. 6 is a schematic view of an example computing device 200, one or more of which may be used to perform the method 100 of FIG. 5. The computing device 200 includes processing circuitry 202 operatively connected to memory 204 and a communication interface 206. The processing circuitry 202 may include one or more microprocessors, microcontrollers, application specific integrated circuits (ASICs), or the like. The memory 204 may include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory 204 may incorporate electronic, magnetic, optical, and/or other types of storage media.

The communication interface 206 is operable to facilitate communication between the computing device 200 and other devices, such as other computing devices (e.g., over a local or wide area communication network), and/or input/output devices such as a keyboard, mouse, touch screen, or electronic display.

FIG. 7 is a schematic view of the functional failure 26A of FIG. 4 in a table form. As shown, the functional failure 26A can be succinctly summarized in one row of a table, and in certain columns (e.g., the anti-function and "functional failure effects") columns, multiple items can be listed in a single cell. By creating the elements and relationships in FIG. 4, the contents of the table in FIG. 7 may be automatically populated. Although not shown in FIG. 7, the functional failure 26B could be represented in an additional table row.

Figure 8:
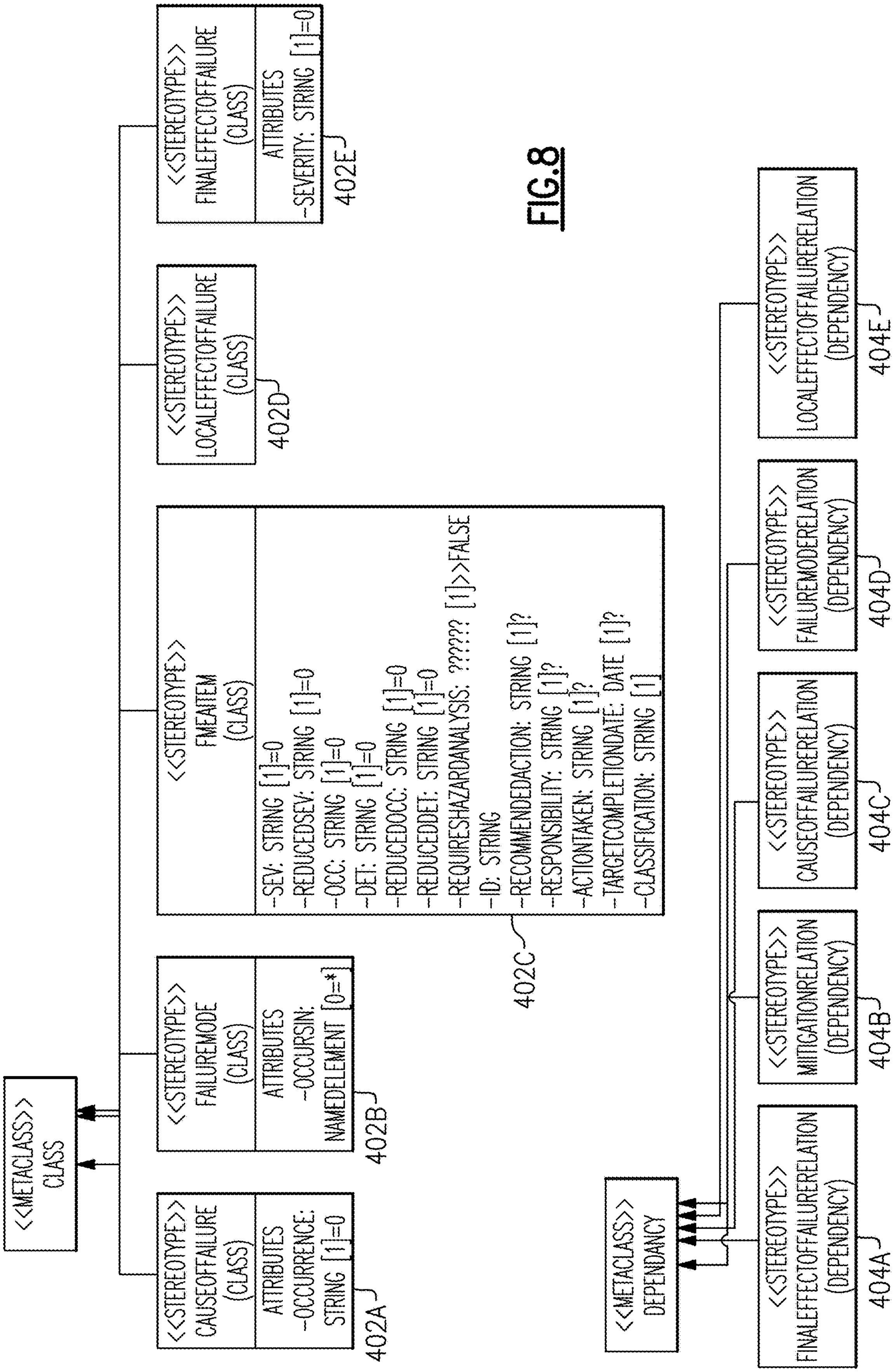
FIG. 8 is a schematic view of a plurality of custom SysML elements used by a prior art software package.

FIG. 8 is a schematic view of a plurality of custom SysML elements used by a prior art software package. In this package, 5 custom SysML classes 402A-E are used, and five custom SysML dependencies 404A-E. This requires considerably more SysML custom elements than what is described in FIG. 3, where only five custom SysML elements are used (two classes, two dependencies and one activity).

Moreover, because the prior art approach uses so many columns, and uses single items in each cell, it would take 6 rows to represent what is shown between FIGS. 4 and 7, because each combination of items (i.e., each combination of one of the two different causes 40A-B and three different system level effects 40E-G) would require its own discrete row.

The approach described herein, by using fewer SysML custom elements, utilizes less data storage (due in part to fewer table rows), and by exhibiting a stronger reliance on core (i.e., non-custom) SysML elements, less additional training is likely to be needed for users.

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. A method of using Systems Modeling Language (SysML) for a hazard analysis description that describes a potential functional failure of a physical system, comprising:

describing the potential functional failure of the physical system in SysML using a first type of custom SysML element;

describing at least one potential cause and at least one potential effect of the potential functional failure with respective instances of a second type of custom SysML element; and linking the at least one cause and the at least one effect to the potential functional failure using respective instances of a third type of custom SysML element that represents causation;

wherein the first type of custom SysML element has a different SysML metaclass than the second type of custom SysML element.

2. The method of claim 1, wherein the third type of custom SysML element has a different SysML metaclass than the first type of custom SysML element and the second type of custom SysML element.

3. The method of claim 2, wherein:

the metaclass of the first type of custom SysML element is class;

the metaclass of the second type of custom SysML element is activity; and the metaclass of the third type of custom SysML element is dependency.

4. The method of claim 2, comprising:

describing in SysML each of one or mitigations that can be implemented to mitigate an effect or likelihood of the potential functional failure; and linking each of the one or more mitigations to the potential functional failure using a respective fourth type of custom SysML element.

5. The method of claim 4, wherein:

the fourth type of custom SysML element and the third type of SysML element have a same SysML metaclass.

6. The method of claim 4, wherein each of the mitigations is described using one or more native, non-custom SysML element types.

7. The method of claim 4, comprising:

describing a potential system level effect of the potential functional failure using a fifth type of custom SysML element;

wherein the potential system level effect is linked to and is a higher level effect than a particular one of the at least one potential effects; and wherein the potential system level effect is linked to the particular one of the at least one potential effects using an instance of the third type of custom SysML element.

8. A method of using Systems Modeling Language (SysML) for a hazard analysis description that describes a potential functional failure of a physical system, comprising:

describing the potential functional failure of the physical system in SysML using a first type of SysML element; and describing at least one potential cause and at least one potential effect of the potential functional failure with respective instances of a second type of SysML element; and linking the at least one cause and the at least one effect to the potential functional failure using respective instances of a third type of SysML element that represents causation; wherein the first type of SysML element has a different SysML metaclass than the second type of SysML element; and wherein the third type of SysML element has a different SysML metaclass than the first type of SysML element and the second type of SysML element.

9. The method of claim 8, wherein:

the metaclass of the first type of SysML element is class;

the metaclass of the second type of SysML element is activity; and the metaclass of the third type of SysML element is dependency.

10. The method of claim 8, comprising:

describing in SysML each of one or mitigations that can be implemented to mitigate an effect or likelihood of the potential functional failure; and linking each of the one or more mitigations to the potential functional failure using a respective fourth type of SysML element.

11. The method of claim 10, wherein:

the fourth type of SysML element and the third type of SysML element have a same SysML metaclass.

12. The method of claim 10, comprising:

describing a potential system level effect of the potential functional failure using a fifth type of SysML element;

wherein the potential system level effect is linked to and is a higher level effect than a particular one of the at least one potential effects; and wherein the potential system level effect is linked to the particular one of the at least one potential effects using an instance of the third type of SysML element.

13. A system for using Systems Modeling Language (SysML) for a hazard analysis description that describes a potential functional failure of a physical system, comprising:

processing circuitry operatively connected to memory and configured to:

describe the potential functional failure of the physical system in SysML using a first type of custom SysML element; and describe at least one potential cause and at least one potential effect of the potential functional failure with respective instances of a second type of custom SysML element; and link the at least one cause and the at least one effect to the potential functional failure using respective instances of a third type of custom SysML element that represents causation;

wherein the first type of custom SysML element has a different SysML metaclass than the second type of custom SysML element.

14. The system of claim 13, wherein the third type of custom SysML element has a different SysML metaclass than the first type of custom SysML element and the second type of custom SysML element.

15. The system of claim 14, wherein:

the metaclass of the first type of custom SysML element is class;

the metaclass of the second type of custom SysML element is activity; and the metaclass of the third type of custom SysML element is dependency.

16. The system of claim 14, wherein the processing circuitry is configured to:

describe in SysML each of one or mitigations that can be implemented to mitigate an effect or likelihood of the potential functional failure; and link each of the one or more mitigations to the potential functional failure using a respective fourth type of custom SysML element;

wherein the fourth type of custom SysML element and the third type of SysML element have a same SysML metaclass.

17. The system of claim 16, wherein:

the processing circuitry is configured to describe a potential system level effect of the potential functional failure using a fifth type of custom SysML element;

the potential system level effect is linked to and is a higher level effect than a particular one of the at least one potential effects; and the potential system level effect is linked to the particular one of the at least one potential effects using an instance of the third type of custom SysML element.

* * * * *